J. STEWART & W. CAMPBELL.
Apple-Paring, Coring, and Slicing-Machines.
No. 140,315. Patented June 24, 1873.
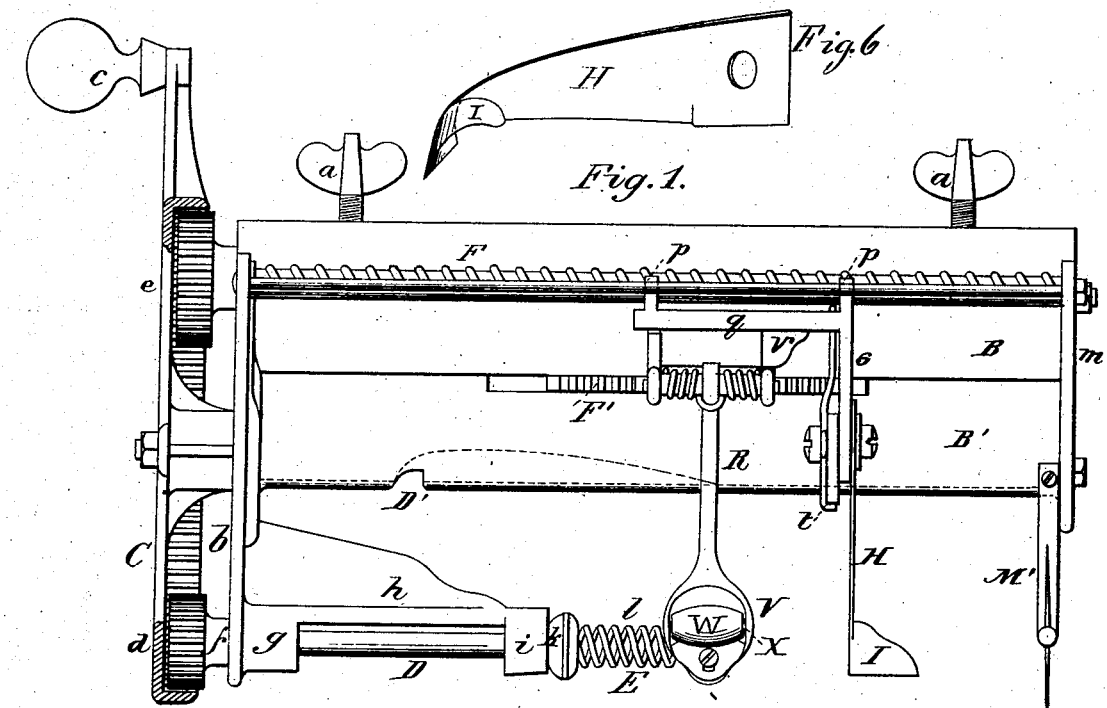
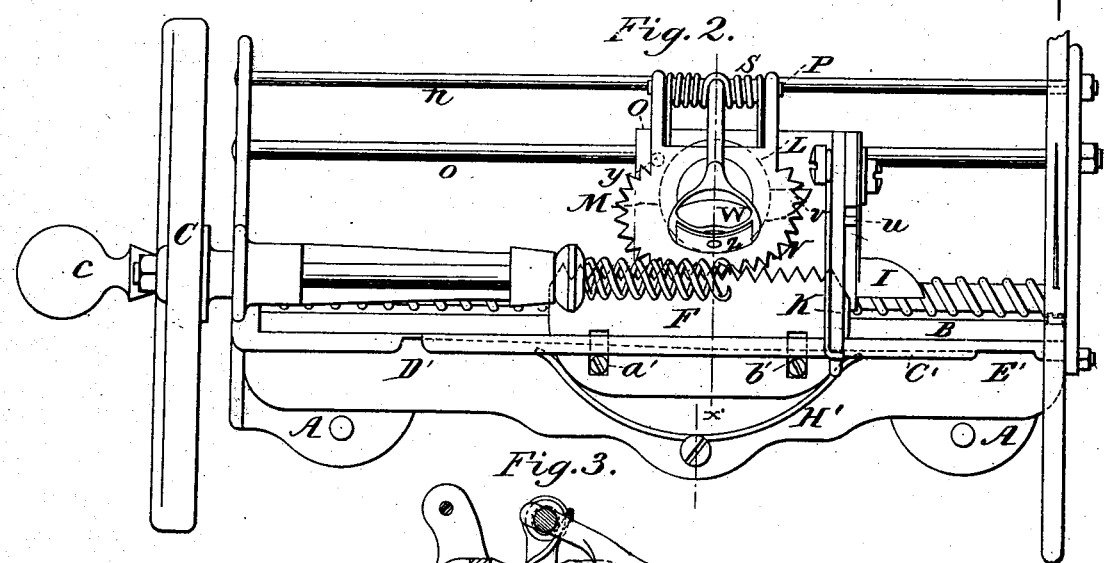
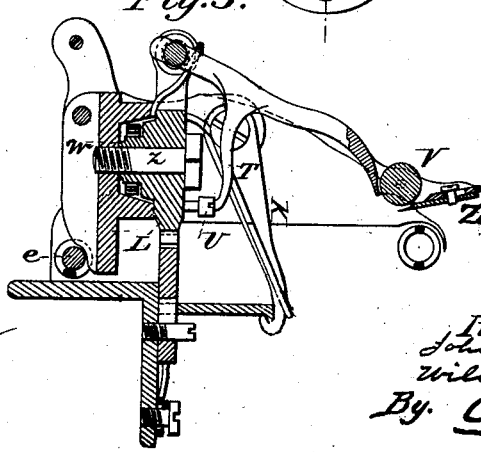

UNITED STATES PATENT OFFICE.

JOHN STEWART AND WILL CAMPBELL, OF FOWLER, ILLINOIS.

IMPROVEMENT IN APPLE PARING, CORING, AND SLICING MACHINES.

Specification forming part of Letters Patent No. 140,315, dated June 24, 1873; application filed May 13, 1873.

*To all whom it may concern:*

Be it known that we, JOHN STEWART and WILL CAMPBELL, of Fowler, Adams county, Illinois, have invented certain new and useful Improvements in Machines for Paring, Slicing, Coring, and Dividing Apples and other Fruit, of which the following is a specification, reference being had to the accompanying drawings.

The invention relates to a device for paring, slicing, coring, and dividing apples or other fruit or vegetables, being peculiarly adapted to all fruits having a core or otherwise of the proper consistency about the center; and consists, first, in providing the said device with a paring-knife, so operated as to remove the skin of the fruit from all parts thereof outside of the parts operated upon by the coring-knife; second, in conjunction with said paring-knife, providing a convex anti-friction roller, to prevent any friction upon the device by the fruit when being operated upon; third, in providing the arm upon which said paring-knife is mounted with the segment of a cogged guide or flattened sphere, so formed as to enable the said paring-knife to operate upon a line describing one-half of the periphery of the vertical central plane of an ordinary-shaped apple; fourth, in providing said segmental cog with a yielding ratchet, to assist the rotation of the cog and the preservation of an even pressure of the paring-knife upon the fruit; fifth, in providing said device with a coring-knife, which is so arranged that its cutting-edge comes in contact with the parts of the fruit about the core with a draw-cut; sixth, in providing said device with a double-spiral fork for securely holding the fruit.

Figure 1 is a plan view of a device embodying our invention. Fig. 2 is a front view of the same. Fig. 3 is a section on the line $x$. Figs. 4 and 5, views of the divider. Fig. 6 is a perspective of the coring and slicing mechanism.

A in the accompanying drawings is a lip or shelf, provided at each end with the screw-clamps $a$. Above the lip A a suitable distance is the platform B, between which and the lip A passes the edge of the table or bench to which the device may be firmly secured by the clamps $a$, the lip A and platform B being connected by the facing A'. The device is provided at one end with the plate $b$, at about the center of which is mounted, upon a fixed axle, the internally-toothed spur-gear wheel C, provided with the crank or handle $c$, and engaging the pinions $d$ and $e$. The pinion $d$ is secured rigidly at one end of the shaft D, which is provided with the fixed washer $f$, beyond which the shaft passes through the journal $g$ on the upper end of the plate $b$, thence extending parallel to and above the arm $h$, passing through a journal, $i$, at the end of the arm, where it is provided with a thread fitting into a threaded aperture in the head of the double-spiral fork E, consisting of a head, $k$, rounded on each side and serving as the base of the tines $l$, which vanish into its outer surface. The tines $l$ form a double-spiral fork, their extremities being pointed and inclined outward, the diameter of the fork E being the same from end to end, and somewhat less than the greatest diameter of the core of an ordinary-sized apple. The pinion $e$ is rigidly secured upon one extremity of an axle at one end of the traveling screw F, which extends from its bearing in the base of the plate $b$ parallel to and a proper distance below the fork E, to the plate $m$ at the opposite side of the device, where it is also provided with an axle and bearings. Opposite and parallel to the traveling screw F are provided the guides $n$ and $o$, the latter being nearer the screw, and each separated from the other a proper distance and secured firmly at their ends in the plates $b$ and $m$. The rod $o$ passes through the ears $p$, secured to the lower side of the platform $q$, somewhat in front of and below their vertical center, the front sides of the ears $p$ being reduced, and provided with a concave groove, $r$, the curve of which fits over the shaft of the screw F. At the end of the platform $q$, opposite the plate $m$, is provided the plate $s$, to the side of which, towards the plate $m$, is secured the slicing-knife H, the edge of which stands at right angles to the horizontal diameter of the fork E, when in juxtaposition, and in such relation thereto that, when in the operation of slicing, the slicing-knife H is passing the fork E the upper end of the edge of the knife is in close proximity to and below the fork. To the upper extremity of the slicing-knife H is secured the coring-knife I, which is arched in shape having its cutting-side edge properly inclined, and both side edges coming to a point coincident with the upper extremity of the cutting-edge of the slicing-knife H. By this arrangement of the coring-knife I the material coming in contact with its cutting-edge receives a draw-cut—that is, no two points of this edge, when cutting, bear upon the material being operated upon in the same plane. When in operation, the coring-knife I is in proper proximity to and partially incloses the fork E. On the side of the plate s, opposite that on which the knife H is secured, is provided the guide-hook K, the shank of which is pivoted to the plate s, the hook, when in operation, passing over the guide C′, being pressed thereon by the spring t, while a stud, u, upon the other side of the shank passes into a notch in the upper edge of the plate s, thus preventing the hook swinging too far downward. At the other end of the platform q is provided the raised hollow seat L, which is furnished on its side adjacent the plate s with the projecting shoulder v. To one side of the interior of the seat is secured one end of a helical or coiled spring, w, the other end of which is attached to the round stud x, on the base of the cogged-guide M, about which stud the spring w is coiled, thus giving the stud x and its attachments a rotary bearing from front to rear when the spring is contracted, the movement thus produced being checked by the stud y coming in contact with the shoulder v. The pivot z passes vertically through the central portions of the cogged guide M, is secured rigidly in a vertical portion by a screw at its lower end, which enters a threaded aperture in the center of the seat L, thus serving as a fixed axle for the cogged guide M to rotate upon. A shoulder being provided on the pivot, which projects below the under surface of the stud x, prevents that element coming in contact with the seat L when the cogged guide M is rotated. The stud x comes in close relation to the surface of the seat L, and being of less diameter than the seat, there is thus formed a chamber between the stud and sides of the seat, in which the spring w can relax. The base of the cogged guide M is properly reduced, to allow it to enter and revolve in the interior of the seat L, above which reduced parts the front portion of the cog is provided with the teeth N, of proper construction—a pointed form preferred—arranged in the form of an elongated or flattened arch, the curve of the center of which is flatter than the curves at the ends, the general outline of the teeth as arranged being similar to one-half of the periphery of the vertical central plane of an apple of ordinary shape—that is, the periphery of the curved portion of a hemisphere flattened as its sides and curving at its poles toward its vertical axis; the above-described form being used in the present instance as especially adapted to apples, but other arrangements of the teeth N, may be readily made to conform to the shape of the fruit to be operated upon. The rear portion of the cogged guide M is somewhat reduced in width, and provided with the arms O, at the junction of one of which with the main portion of the cog, and on the under side thereof, is placed the stud y, the point of which is in close relation to the platform q adjacent the exterior of the seat L, and comes in contact with the shoulder v preventing too great movement of the cogged guide M, when rotated by the action of the spring w, and serving also to retain the cog in its initial position. The extremities of the arms O are connected by the bar P, provided at its center with the vertical standard R, about the rear of the base of which passes the center of the spiral spring S; the remainder whereof is coiled on the bar P, on each side of the standard, thus giving it pressure from the two sections of the spring, and a bearing toward that portion of the device upon which the fork E is attached, the standard being provided with the supporting-arm T projecting downward and backward, sustained by the adjustable rest U, and preventing the standard being forced too far downward by the elevation or depression of which rest the bearing or pressure of the knife Z and roller W upon the fruit may be regulated. The upper end of the standard R, is enlarged into a concavo-convex head V, the portion of which containing the knife faces outward, at an angle of about forty-five (45°) to the axis of the fork E, its horizontal center being somewhat below the corresponding plane of the axis of the fork. This is the initial position of the head V. The central portions of the head V are removed, and the head provided with the anti-friction roller W, so mounted upon the axle X that its bearing-surface is in the same curve as the lower convex portion of the head V. A recess is provided in the face of the head V above the roller W, into which is fitted the curved or arched knife Z, the cutting-edge of which is in close relation to the roller W, and separated therefrom a distance sufficient to allow the paring to pass between the knife and roller, the knife being so arranged that, guided by the cogged guide M, it passes over the surface of the apple, its edge coming in contact with all portions thereof outside of or opposite those parts operated upon by the coring-knife I. The platform B is provided at the proper part of its front portions with the vertical plate B′, extending from one side of the device to the other, and having on the rear side of its upper edge the guide C′, at one end of which a portion is removed to allow the hook K to pass over the upper edge of the plate B′, while at the other end the guide C′ is cut by the diagonal slot D′, forming the mouth of the recess E′, which is cut in the upper part of the plate B′, and increases in depth toward the wheel C, terminating in the slot D′, through which the hook K passes when the operations of paring, slicing, and coring are completed. At the center of the platform B is provided the yielding ratchet F' secured to the platform by the screws a' passing through the slots b', one of which is provided at each end of the ratchet, thus allowing it a rocking and backward movement. The arched spring H' forces the ratchet forward, and is secured to the platform B, its extremities resting against the ends of the rear edge of the ratchet, the front edge of which is rounded at one end, the remainder being provided with teeth, this edge being arranged so as to engage the arched part of the cogged guide M while the paring operation is in progress. The rear edge of the guide C' is inclined toward the slot D', in order to diminish the traction of the hook K as affected by the pressure of the yielding ratchet F'; thus, as the platform $q$ advances, the depth of the cut of the slicing and coring knives is reduced as they approach the base of the fork E.

The platform $q$ is moved to a point opposite the open portion of the guide C, when it is brought into a horizontal position, the guide-hook K passing over the top edge of the plate B'. The apple is held in the left hand with the parts thereof adjacent the stem pressed firmly against the points of the tines of the fork E, which pressure is maintained until the base of the fork enters the aperture about the stem end of the apple, the wheel C having been rotated from the time the fruit was first placed against the tines. The fruit is thus firmly secured upon the fork in position to be operated upon. The revolution of the wheel C being continued, the operation of the pinion $e$ causes the rotation of the traveling screw F, the threads whereof acting upon the ears $p$ adjacent the grooves $r$ the platform is drawn toward the wheel C, its rear supported by the rod $o$, its front by the hook K, which also holds the curves $r$ firmly upon the shaft of the traveling screw. The movement of the platform continues, the lower inner corner of the knife Z coming in contact with the fruit, now revolving, adjacent its eye at a point immediately adjacent the plane in which the fork E rotates; then by the operation of the abrupt arch at the end of the curved portion of the cogged guide M, which now engages the ratchet F, the head V and knife Z are forced back, but still advancing toward the wheel C pass about this surface of the apple, whereby every portion of the skin outside of the plane in which the coring-knife will operate is removed, the parings passing under the knife Z and over the roller W, which, revolving upon its axis, diminishes the friction between the fruit and device. After this abrupt curve the knife Z reaches the flatter and more central portions of the surface of the apple upon which it operates, owing to the cogged guide M having reached its flatter curve, with a more gentle curve, the head V still gradually turning toward the fork E, and the ratchet F' yielding to the pressure of the cogged guide M. This operation continues until the more rounded portions of the apple about the stem are reached, when the cogged guide M having reached the abrupt arch at its other side the head V is again quickly rotated, bringing its side against the surface of the head of the fork E, and the outer (now inner) corner of the knife Z to a point immediately adjacent the junction of the tines of the fork E with the head $k$, thus removing all the skin from the stem end of the fruit outside the head $k$, which completes the operation of paring.

In the above operation, the movement of the cog M on the pivot $z$ has contracted the spring $w$ about the stud $x$; hence, as, when the above operation is ended, the teeth N have ceased to engage the teeth of the ratchet F', the spring $w$ acts, rotating the cogged guide M until the stud $y$ comes in contact with the shoulder $v$. Almost simultaneously with the completion of the operation of paring, the edge of the slicing-knife H first comes in contact with the fruit, which, moving against a cutting-edge, is cut spirally to a point near its center. The part thus cut being, as the apple rotates, forced upward along the side of the slicing-knife is brought in contact with the inclined cutting-edge of the coring-knife I at a draw-cut, whereby the sliced portion of the apple is severed or trimmed from the portions about the center of the apple, leaving the core and those portions of the apple between the lower edge of the coring-knife I and the fork E adhering to the fork, which portions, by the decreasing depth of the cuts of the knives H and I, owing to the lessening traction of the hook K, are formed into a cylinder, tapering from the part at the head of the fork to the part above the tines. Thus the friction of the operation of coring is greatly reduced, the spirally-sliced portion of the apple being severed from the core instead of the knife passing directly through the fruit.

By the above arrangement the only bearing upon the cutting-edge of the coring-knife is a surface equal to the thickness of the spiral slice; thus the danger of breaking the coring-knife is effectually guarded against, and the coring-edge being inclined and arched prevents the spiral slice breaking when cored.

The operation of slicing and coring continues until the coring-edge passes the point opposite the head $k$ of the fork E, thus cutting the spiral slice clear from the core. Immediately after the last operation is over the hook K rides up the inclined portion of the diagonal portion of the slot D', and being pressed thereon by the action of its spring, as the platform $q$ moves toward the wheel C deflects the head V toward the front until the hook K reaches the center of the diagonal slot D', when the specific gravity of the mechanisms upon the platform $q$ preponderating toward the front, the hook K is drawn through the slot D', and the platform $q$ and its attachments fall over upon the guide-rod $n$, thus disengaging the grooves $r$ and permitting the platform $q$ and its attachments to be slid upon the rods $n$ and $o$ to the other end of the device, where they may be restored to their initial position, as above set forth.

The cylindrical section of fruit remaining upon the fork E should be removed when the platform $q$ is in its depressed position, which may be effected by grasping the section with one hand and slightly rotating the wheel C in a direction opposite that above followed with the other.

It is obvious that the spiral fork may be removed, and one having straight or other tines substituted; the spiral form is, however, preferred as holding the fruit more securely. The blade L' may be arranged to cut the fruit in three or more sections by increasing its number of cutting-edges, or placing an inclined cutting-edge or blade on the other or on another side of the stem I. The roller W should be made of anti-friction material.

It is also evident that the teeth N may be dispensed with, the essential feature of this element of the invention being that the cogged-guide M, whether provided with the teeth N or not, be shaped so as to cause the knife Z to move on a line corresponding generally with one-half of the periphery of the vertical central plane of the fruit to be operated upon. Thus the fruit to be pared is the true index as to the form for the edge of the cogged guide M, which comes in contact with the yielding ratchet F', which latter element may be made without teeth, as any yielding elastic surface answers the purpose of this device.

What we claim as our invention, and desire to secure by Letters Patent, is—

1. The guide M of a paring-knife, formed according to the contour of the fruit to be operated upon, substantially as set forth.

2. The double-spiral fork E, as and for the purpose shown and described.

3. The convex friction-roller W, in combination with the knife Z, substantially as shown and described.

4. The cogged guide M, supporting a paring-knife, rotated by means of a yielding ratchet, F', substantially as shown and described.

5. The combination of the yielding ratchet F', cogged guide M, standard R, spring S, and knife Z, substantially as shown and described.

6. The combination of the yielding ratchet F', cogged guide M, standard R, spring S, knife Z, spring $w$, stud $y$, and shoulder $v$, substantially as shown and described.

7. The combination of the yielding ratchet F', cogged guide M, standard R, spring S, knife Z, spring $w$, stud $y$, shoulder $v$, traveling screw F, and rod $o$, substantially as shown and described.

8. The combination of the hook K, guide C', and slot D', substantially as shown and described.

9. The combination of the platform $q$, rod $o$, and traveling screw F, substantially as shown and described.

10. The combination of the arched coring-knife I and slicing-knife H, substantially as shown and described.

11. The combination of the coring-knife I, slicing-knife H, hook K, and guide C', substantially as shown and described.

12. The combination of the adjustable rest U, cogged guide M, and arm T, substantially as shown and described.

In testimony that we claim the foregoing improvements in machines for paring, slicing, coring, and dividing apples and other fruit, as above described, we have hereunto set our hands and seals this first day of May, 1873.

JOHN STEWART. [L. S.]
WILL CAMPBELL. [L. S.]

Witnesses:
THEODORE C. POLING,
J. N. CARTER.